United States Patent [19]
Matsuda et al.

[11] Patent Number: 6,160,074
[45] Date of Patent: *Dec. 12, 2000

[54] FLUORINE-CONTAINING CURABLE COMPOSITIONS

[75] Inventors: Takashi Matsuda; Shinichi Sato; Masatoshi Arai; Hirofumi Kishita, all of Usui-gun, Japan

[73] Assignee: Shin-Etsu Chemical Co., Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/984,188

[22] Filed: Dec. 3, 1997

[30] Foreign Application Priority Data

Dec. 4, 1996 [JP] Japan .................................. 8-339049

[51] Int. Cl.$^7$ .................................................. C08G 77/24
[52] U.S. Cl. ................................ 528/42; 528/26; 528/29; 528/15; 528/104; 528/474
[58] Field of Search ............................... 528/26, 29, 42, 528/15; 525/104, 474

[56] References Cited

U.S. PATENT DOCUMENTS

| | | | |
|---|---|---|---|
| 5,300,613 | 4/1994 | Kishita et al. | 528/26 |
| 5,352,752 | 10/1994 | Koike et al. | 528/26 |
| 5,380,811 | 1/1995 | Kishita et al. | 528/15 |
| 5,416,183 | 5/1995 | Sato et al. | 528/15 |
| 5,705,586 | 1/1998 | Sato et al. | 528/15 |
| 5,705,591 | 1/1998 | Matsuda et al. | 528/42 |

*Primary Examiner*—David W. Wu
*Assistant Examiner*—Caixia Lu
*Attorney, Agent, or Firm*—Millen, White, Zelano, & Branigan, P.C.

[57] ABSTRACT

The invention provides a fluorine-containing curable composition comprising (A) a linear perfluoro compound having at least two alkenyl groups in its molecule and a divalent perfluoroalkylene or perfluoropolyether structure in its backbone, (B) a fluorinated organohydrogenpolysiloxane having at least four hydrosilyl groups in its molecule and a divalent perfluoro structure in its backbone, and (C) a platinum catalyst.

11 Claims, No Drawings

FLUORINE-CONTAINING CURABLE COMPOSITIONS

BACKGROUND OF THE INVENTION

This invention relates to a fluorine-containing curable composition which is readily curable at room temperature or by moderate heating into a cured product having solvent resistance, chemical resistance, heat resistance, and minimized compression set.

Fluorine-containing curable compositions have been utilized in a variety of fields. Most cured products of currently commercially available fluorine-containing curable compositions are not sufficient in solvent resistance and chemical resistance. Cured products having better solvent resistance and chemical resistance are desired. Low compression set is desired in their application as sealing members and O-rings.

SUMMARY OF THE INVENTION

An object of the invention is to provide a fluorine-containing curable composition which is readily curable into a cured product having solvent resistance, chemical resistance, and minimized compression set.

The invention provides a fluorine-containing curable composition comprising a linear perfluoro compound and a fluorinated organohydrogenpolysiloxane as main components. More particularly, we have found that by blending a linear perfluoro compound having at least two alkenyl groups in a molecule, a divalent perfluoroalkylene or perfluoropolyether structure in a backbone, and a viscosity of 25 to 1,000,000 centistokes at 25° C. with a specific amount of a fluorinated organohydrogenpolysiloxane of the following general formula (1) and a platinum group metal compound, there is obtained a fluorine-containing curable composition which is readily curable into a cured product having solvent resistance, chemical resistance, heat resistance and minimized compression set.

The present invention provides a fluorine-containing curable composition comprising (A) a linear perfluoro compound having at least two alkenyl groups in a molecule, a divalent perfluoroalkylene or perfluoropolyether structure in a backbone, and a viscosity of 25 to 1,000,000 centistokes at 25° C., (B) a fluorinated organic silicon compound of the following general formula (1) having a viscosity of 10 to 5,000 centistokes at 25° C., and (C) a catalytic amount of a platinum group metal compound. Component (B) is blended in such an amount as to give 0.5 to 5 mol of hydrosilyl group per mol of alkenyl group in component (A).

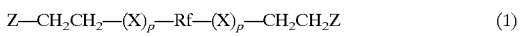
$$Z-CH_2CH_2-(X)_p-Rf-(X)_p-CH_2CH_2Z \quad (1)$$

Rf is a divalent perfluoroalkylene or perfluoropolyether group. X is independently selected from the group consisting of $-CH_2-$, $-CH_2O-$, $-CH_2OCH_2-$, $-Y-NR^1-SO_2-$ and $-Y-NR^1-CO-$ wherein Y is $-CH_2-$ or

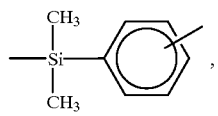

and $R^1$ is a hydrogen atom or a substituted or unsubstituted monovalent hydrocarbon group. Letter p is independently equal to 0 or 1. Z is a group of the following general formula (2):

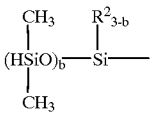

wherein $R^2$ is a substituted or unsubstituted monovalent hydrocarbon group and letter b is equal to 2 or 3.

Preferably, the linear perfluoro compound (A) is of the following general formula (3).

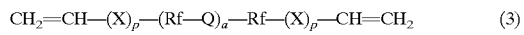
$$CH_2=CH-(X)_p-(Rf-Q)_a-Rf-(X)_p-CH=CH_2 \quad (3)$$

Rf, X, and p are as defined above. Q is a group of the following general formula (4), (5) or (6):

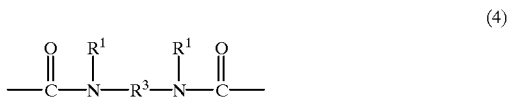

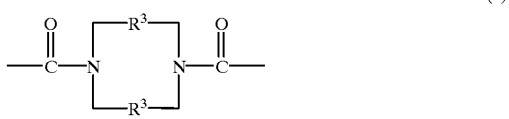

wherein X, p, and $R^1$ are ad defined above, $R^3$ is a substituted or unsubstituted divalent hydrocarbon group, $R^4$ is a substituted or unsubstituted divalent hydrocarbon group which may have at least one intervening atom selected from oxygen, nitrogen, silicon, and sulfur atoms in its linkage or a group of the following general formula (7) or (8):

wherein $R^5$ is a substituted or unsubstituted monovalent hydrocarbon group and $R^6$ is a group containing at least one atom selected from carbon, oxygen, nitrogen, silicon, and sulfur atoms in its backbone structure. Letter a is 0 or a positive integer.

DETAILED DESCRIPTION OF THE INVENTION

Component (A) of the curable composition of the invention is a linear perfluoro compound having at least two alkenyl groups in a molecule, a divalent perfluoroalkylene or divalent perfluoropolyether structure in a backbone, and a viscosity of 25 to 1,000,000 centistokes at 25° C. The perfluoro compound is preferably of the following general formula (3).

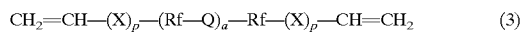
$$CH_2=CH-(X)_p-(Rf-Q)_a-Rf-(X)_p-CH=CH_2 \quad (3)$$

Rf is a divalent perfluoroalkylene or divalent perfluoropolyether group. Preferred divalent perfluoroalkylene groups are represented by —$C_mF_{2m}$— wherein m is 1 to 10, preferably 2 to 6. Preferred divalent perfluoropolyether groups are represented by the following formulae.

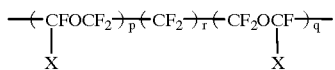

X is F or $CF_3$ group, letters p, q, and r are integers satisfying $p \geq 1$, $q \geq 1$, $2 \leq p+q \leq 200$, especially $2 \leq p+q \leq 110$, and $0 \leq r \leq 6$.

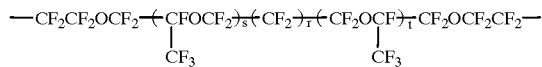

Letters r, s, and t are integers satisfying $0 \leq r \leq 6$, $s \geq 0$, $t \geq 0$, $0 \leq s+t \leq 200$, especially $2 \leq s+t \leq 110$.

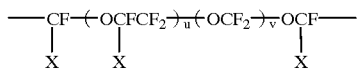

X is F or $CF_3$ group, letters u and v are integers satisfying $1 \leq u \leq 100$ and $1 \leq v \leq 50$.

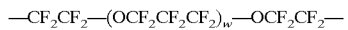

Letter w is an integer of $1 \leq w \leq 100$.
Examples of the group represented by Rf are given below.

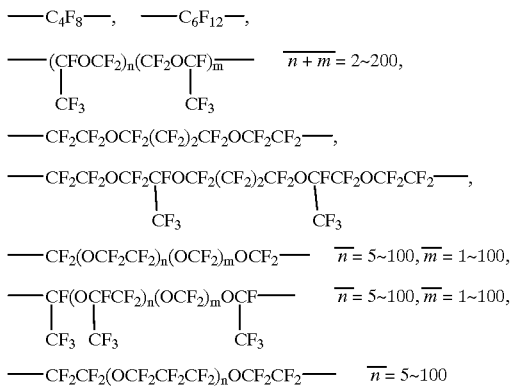

Q is a group of the following general formula (4), (5) or (6).

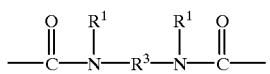

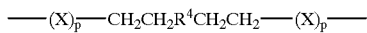

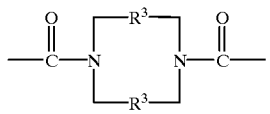

$R^1$ is a hydrogen atom or a substituted or unsubstituted monovalent hydrocarbon group, preferably having 1 to 12 carbon atoms. Examples of the hydrocarbon group include alkyl groups such as methyl, ethyl, propyl, isopropyl, butyl, isobutyl, tert-butyl, pentyl, neopentyl, hexyl, heptyl, octyl, nonyl, and decyl; cycloalkyl groups such as cyclopentyl, cyclohexyl, and cycloheptyl; aryl groups such as phenyl, tolyl, xylyl, and naphthyl; and aralkyl groups such as benzyl, phenylethyl, and phenylpropyl. Also included are substituted ones of these groups wherein some or all of the hydrogen atoms are replaced by halogen atoms such as fluorine, chlorine and bromine, for example, chloromethyl, bromoethyl, chloropropyl, trifluoropropyl, and 3,3,4,4,5,5,6,6,6-nonafluorohexyl.

$R^3$ is a substituted or unsubstituted divalent hydrocarbon group, preferably having 1 to 10 carbon atoms, especially 2 to 6 carbon atoms. Examples include alkylene groups such as methylene, ethylene, propylene, methylethylene, butylene, and hexamethylene; cycloalkylene groups such as cyclohexylene; arylene groups such as phenylene, tolylene, xylylene, naphthylene, and biphenylene; and substituted ones of these groups wherein some hydrogen atoms are replaced by halogen atoms. It is noted that in formula (6), two $R^3$ groups may be the same or different.

$R^4$ is a substituted or unsubstituted divalent hydrocarbon group which may be separated by at least one intervening atom selected from oxygen, nitrogen, silicon, and sulfur atoms. Alternatively, $R^4$ is a group of the following general formula (7) or (8).

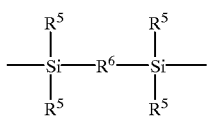

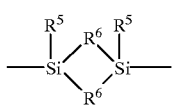

$R^5$ is a substituted or unsubstituted monovalent hydrocarbon group and $R^6$ is a group containing at least one atom selected from carbon, oxygen, nitrogen, silicon, and sulfur atoms in its backbone structure.

In the group of formula (7) or (8) represented by $R^4$, examples of the monovalent hydrocarbon group represented by $R^5$ are the same as the substituted or unsubstituted monovalent hydrocarbon group described for $R^1$. The group represented by $R^6$ is exemplified by substituted or unsubstituted divalent hydrocarbon groups, preferably having 1 to 20 carbon atoms, especially 1 to 10 carbon atoms. Examples include alkylene groups such as methylene, ethylene, propylene, methylethylene, butylene, and hexamethylene; cycloalkylene groups such as cyclohexylene; arylene groups such as phenylene, tolylene, xylylene, naphthylene, and biphenylene; substituted ones of these groups wherein some hydrogen atoms are replaced by halogen atoms; and combinations of such substituted or unsubstituted alkylene and arylene groups.

Other exemplary groups represented by $R^6$ are divalent groups containing at least one atom selected from oxygen, nitrogen, silicon, and sulfur atoms in their backbone structure. Herein, the oxygen atom may intervene as —O—, the sulfur atom as —S—, and the nitrogen atom as —NR— wherein R is a hydrogen atom, an alkyl group having 1 to 8 carbon atoms, especially 1 to 6 carbon atoms or an aryl group. The silicon atom may intervene as an organosiloxane-containing group or an organosilylene group. Illustrative examples of the group represented by $R^6$ are given below.

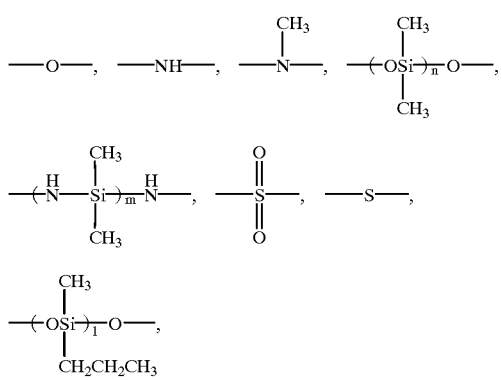

Letters n is an integer of 1 to 5, m is an integer of 1 to 5, and $\lambda$ is an integer of 1 or 2.

Examples of the substituted or unsubstituted divalent hydrocarbon group which may be separated by at least one atom selected from oxygen, nitrogen, silicon, and sulfur atoms, represented by $R^4$, include substituted or unsubstituted divalent hydrocarbon groups and such divalent groups having interposed therein an oxygen, nitrogen, silicon or sulfur atom-containing group as described for $R^6$.

Illustrative examples of the group Q included in formula (3) and represented by formula (4), (5) or (6) are given below. Note that Me is methyl and Ph is phenyl.

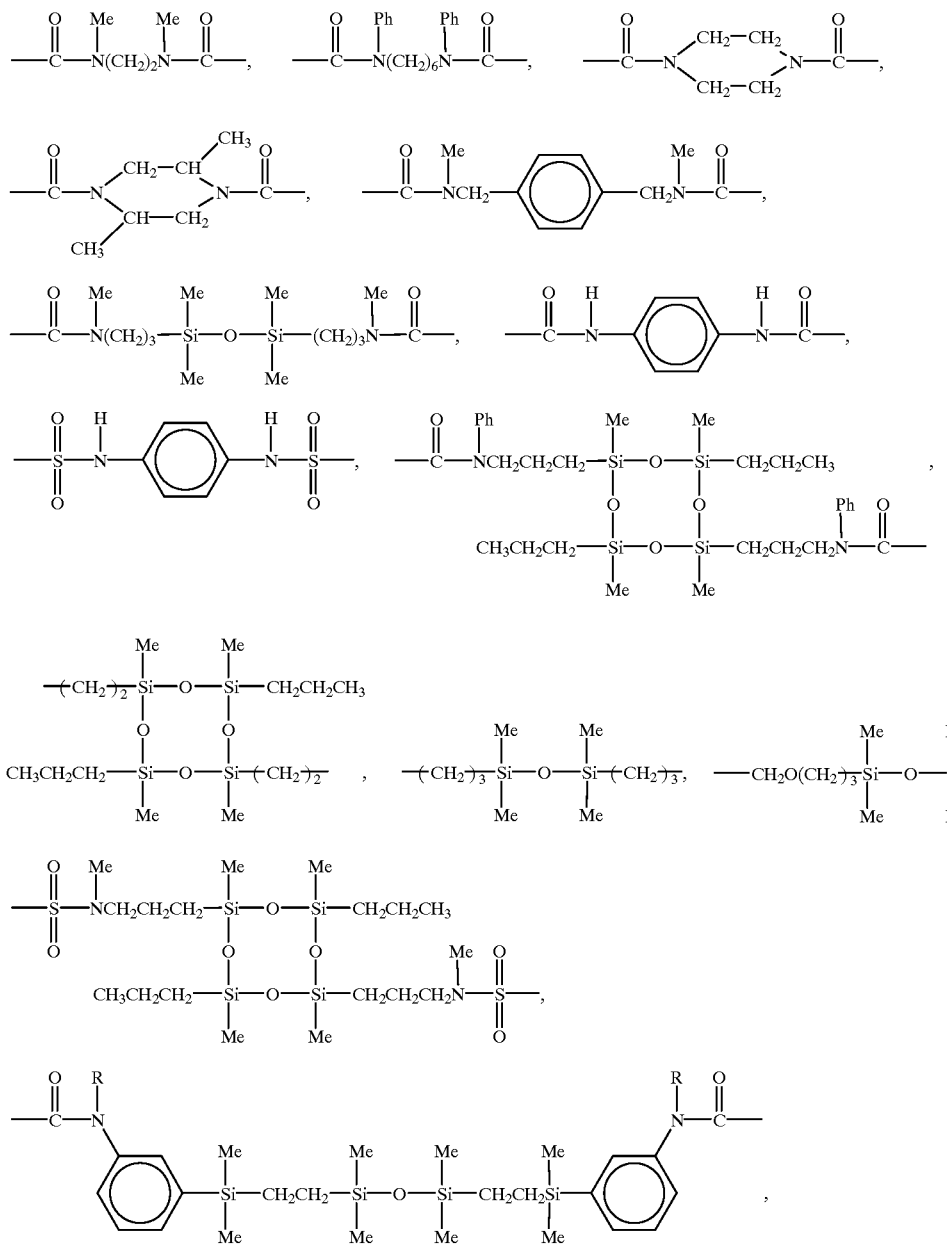

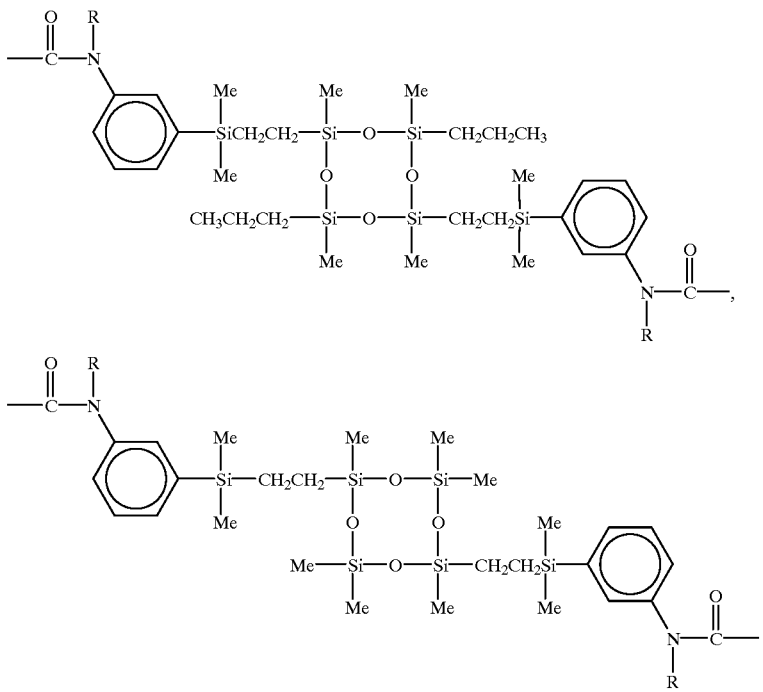

R is hydrogen, methyl or phenyl.

In formula (3), letter $\underline{a}$ is 0 or a positive integer. Accordingly, the fluorinated compound of formula (3) contains at least one divalent perfluoroalkylene or perfluoropolyether group in a molecule. Letter $\underline{a}$ is preferably an integer of 0 to 10, especially 0 to 6.

X is $-CH_2-$, $-CH_2O-$, $-CH_2OCH_2-$, $-Y-NR^1-SO_2-$ or $-Y-NR^1-CO-$. Herein, Y is $-CH_2-$ or

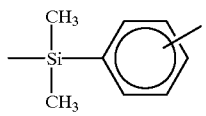

(ortho, meta or para-position). $R^1$ is a hydrogen atom or a substituted or unsubstituted monovalent hydrocarbon group as previously described, preferably methyl, phenyl or allyl.

Letter p is equal to 0 or 1. The perfluoro compound of formula (3) has a vinyl, allyl or similar group at each end.

The linear perfluoro compound as component (A) should have a viscosity of 25 to 1,000,000 centistokes at 25° C., especially 100 to 60,000 centistokes at 25° C. With a viscosity outside this range, there would arise problems including difficulty to form cured rubber having satisfactory properties and poor workability.

Component (B) is a fluorinated organic silicon compound which contains at least four hydrosilyl groups in a molecule and has a divalent perfluoro structure in its backbone. Specifically, the organic silicon compound is of the following general formula (1).

$$Z-CH_2CH_2-(X)_p-Rf-(X)_p-CH_2CH_2-Z \quad (1)$$

Rf is a divalent perfluoroalkylene or divalent perfluoropolyether group. X is independently selected from $-CH_2-$, $-CH_2O-$, $-CH_2OCH_2-$, $-Y-NR^1-SO_2-$, and $-Y-NR^1-CO-$ wherein Y is $-CH_2-$ or

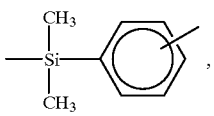

and $R^1$ is a hydrogen atom or a substituted or unsubstituted monovalent hydrocarbon group. Letter p is independently equal to 0 or 1. It is understood that Rf, X and p are as previously defined in formula (3) and that Rf, X and p may be identical or different between formulae (3) and (1).

Z is a group of the following general formula (2):

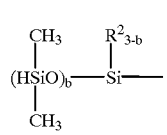

(2)

wherein $R^2$ is a substituted or unsubstituted monovalent hydrocarbon group and letter b is equal to 2 or 3.

Preferably, $R^2$ is a substituted or unsubstituted monovalent hydrocarbon group having 1 to 8 carbon atoms. Examples of the hydrocarbon group include alkyl groups such as methyl, ethyl, propyl, isopropyl, butyl, isobutyl, tert-butyl, pentyl, neopentyl, hexyl, heptyl, and octyl; cycloalkyl groups such as cyclopentyl, cyclohexyl, and cycloheptyl; aryl groups such as phenyl, tolyl, and xylyl; and aralkyl groups such as benzyl and phenylethyl. Also included are substituted ones of these groups wherein some or all of the hydrogen atoms are replaced by halogen atoms such as fluorine, chlorine and bromine, for example, chloromethyl, bromoethyl, chloropropyl, trifluoropropyl, and 3,3,4,4,5,5,6,6,6-nonafluorohexyl.

The fluorinated organic silicon compound of formula (1) should have a viscosity of 10 to 5,000 centistokes at 25° C.

Component (B) is blended in such an amount as to give 0.5 to 5 mol of hydrosilyl group per mol of alkenyl group in component (A).

Component (C) is a platinum group metal compound which is a catalyst for promoting addition reaction or hydrosilylation reaction between components (A) and (B) and serves as a curing promoter.

The platinum group metal compound are generally compounds of noble metals which are expensive. Platinum compounds are often used because they are readily available. Exemplary platinum compounds include chloroplatinic acid, complexes of chloroplatinic acid with olefins such as ethylene, complexes of chloroplatinic acid with alcohols and vinylsiloxanes, and platinum supported on silica, alumina or carbon though not limited thereto. Known platinum group metal compounds other than the platinum compounds include rhodium, ruthenium, iridium, and palladium compounds, for example, $RhCl(PPh_3)_3$, $RhCl(CO)(PPh_3)_2$, $RhCl(C_2H_4)_2$, $Ru_3(CO)_{12}$, $IrCl(CO)(PPh_3)_2$, and $Pd(PPh_3)_4$.

The amount of the catalyst used is not critical. A catalytic amount can achieve a desired curing rate. From the economical aspect and to obtain satisfactory cured products, the platinum group metal compound is preferably added in an amount of 0.1 to 1,000 parts, more preferably 0.1 to 500 parts by weight calculated as the platinum group metal per million parts by weight of the entire curable composition.

To the curable composition of the invention, various additives may be added if necessary to expand its practical utility. Such additives are exemplified by polysiloxanes containing a $CH_2$=CH(R)SiO unit wherein R is hydrogen or a substituted or unsubstituted monovalent hydrocarbon group for controlling the curing rate of the curable composition (see JP-B 10947/1973), acetylene compounds (see U.S. Pat. No. 3,445,420 and JP-B 3774/1979), and ionic compounds of heavy metals (see U.S. Pat. No. 3,532,649).

Fillers may be added to the curable composition of the invention for the purposes of reducing thermal shrinkage upon curing, reducing the coefficient of thermal expansion and gas permeability and improving the thermal stability, weather resistance, chemical resistance, flame retardancy and mechanical strength of a cured elastomer. Such additives include fumed silica, quartz powder, glass fibers, carbon, metal oxides such as iron oxide, titanium oxide, and cerium oxide, and metal carbonates such as calcium carbonate and magnesium carbonate. Also, pigments, dyes and antioxidants are added if desired.

The curable composition of the invention is prepared by any desired method, for example, by mixing the above-mentioned components. A combination of two parts, one part consisting essentially of components (A) and (B) and the other part consisting essentially of components (A) and (C) is also useful. The two parts are mixed on use.

With respect to the curing of the composition, it can be cured at room temperature depending on the type of functional group in component (A) and the type of catalyst (C) although it is usually cured at a temperature of 100 to 200° C. for several minutes to several hours.

On use, the curable composition of the invention may be dissolved in a suitable fluorinated solvent, for example, 1,3-bistrifluoromethylbenzene and perfluorooctane to an appropriate concentration depending on a particular application and purpose.

EXAMPLE

Examples of the invention are given below by way of illustration and not by way of limitation. All parts are by weight.

Comparative Example 1

To 100 parts of a polymer of the formula (i) shown below (viscosity 4,400 cSt, average molecular weight 16,500, vinyl content 0.013 mol/100 g) was added 20 parts of fumed silica treated with $\{Si(CH_3)_3\}_2NH$ (specific surface area 300 m$^2$/g). They were mixed, heat treated and milled on a three-roll mill. To the mixture were added 0.3 part of a 50% toluene solution of ethynyl cyclohexanol, 0.2 part of a toluene solution of a catalyst obtained by modifying chloroplatinic acid with a compound of the formula (ii) shown below (platinum concentration 0.5% by weight), and 2.4 parts of a polyfunctional fluorinated hydrogensiloxane of the formula (iii) shown below, followed by mixing.

The resulting mixture was cured at 150° C. for one hour. The cured product was examined for physical properties: hardness, elongation, tensile strength, and compression set. The results are shown in Table 1.

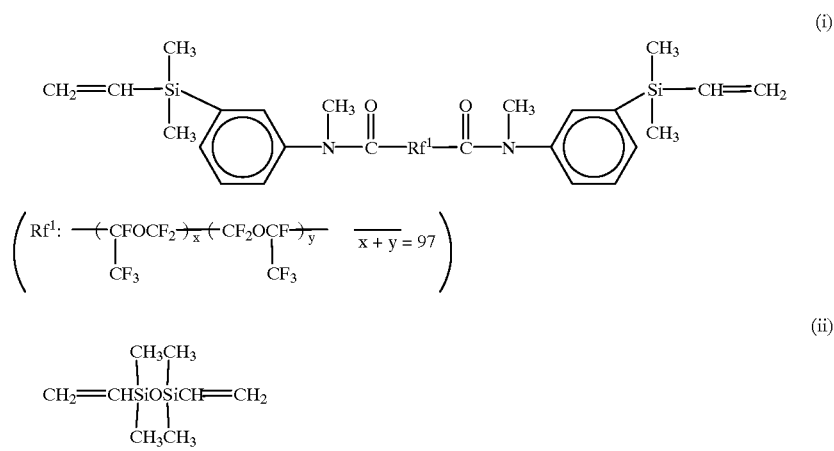

-continued

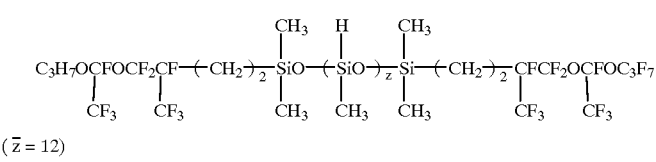
(iii)

($\bar{z} = 12$)

Comparative Example 2

A cured product was obtained as in Comparative Example 1 except that 100 parts of a polymer of the formula (iv) shown below (vinyl content 0.013 mol/100 g) was used instead of the polymer of formula (i), 10 parts of the same surface-treated fumed silica was used, and 2.5 parts of a polyfunctional fluorinated hydrogensiloxane of the formula (V) shown below was used instead of the polyfunctional fluorinated hydrogensiloxane of formula (iii). The cured product was examined for physical properties. The results are shown in Table 1.

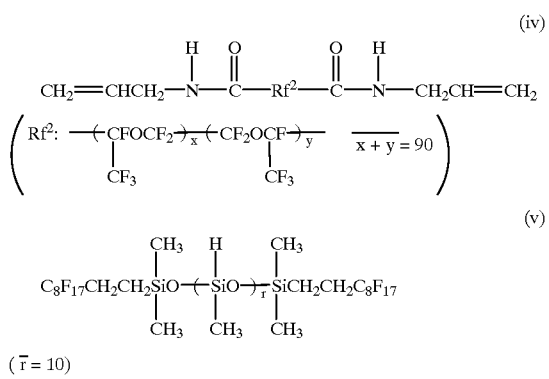
(iv)

(v)

($\bar{r} = 10$)

Comparative Example 3

A cured product was obtained as in Comparative Example 1 except that 3.3 parts of a compound of the formula (vi) shown below was used instead of the polyfunctional fluorinated hydrogensiloxane of formula (iii). The cured product was examined for physical properties. The results are shown in Table 1.

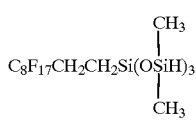
(vi)

Example 1

A composition was prepared as in Comparative Example 1 except that 2.9 parts of a fluorinated organic silicon compound of the formula (vii) shown below was used instead of the fluorinated hydrogensiloxane of formula (iii). The composition was cured under the same conditions as in Comparative Example 1 into a cured product which was examined for physical properties. The results are shown in Table 1.

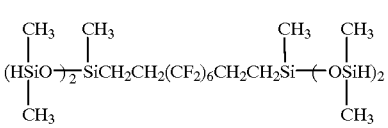
(vii)

Example 2

A composition was prepared as in Comparative Example 2 except that 3.2 parts of a fluorinated organic silicon compound of the formula (viii) shown below was used instead of the fluorinated hydrogensiloxane of formula (v). The composition was cured under the same conditions as in Comparative Example 2 into a cured product which was examined for physical properties. The results are shown in Table 1.

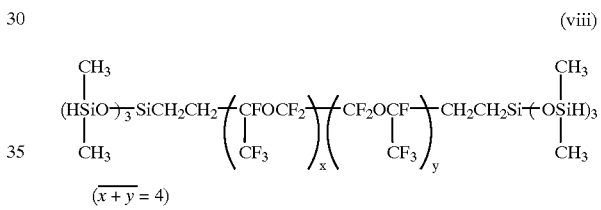
(viii)

($\overline{x+y} = 4$)

Example 3

A composition was prepared as in Comparative Example 3 except that 2.2 parts of a fluorinated organic silicon compound of the formula (ix) shown below was used instead of the fluorinated hydrogensiloxane of formula (vi). The composition was cured under the same conditions as in Comparative Example 3 into a cured product which was examined for physical properties. The results are shown in Table 1.

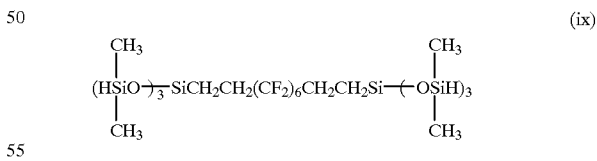
(ix)

TABLE 1

|  | CE1 | CE2 | CE3 | E1 | E2 | E3 |
| --- | --- | --- | --- | --- | --- | --- |
| Hardness (JIS A) | 55 | 30 | 39 | 48 | 38 | 60 |
| Elongation (%) | 250 | 230 | 600 | 310 | 280 | 210 |
| Tensile strength (kgf/cm$^2$) | 42 | 30 | 92 | 72 | 57 | 71 |
| Compression set (%) | 43 | 40 | 42 | 27 | 18 | 19 |

For compression set measurement, and O-ring of the cured composition having a member diameter of 4 mm was measured for compression set under conditions of 25% compression, 200° C., and 24 hours.

In Table 1, Comparative Examples 1 and 2 used fluorinated organic silicon compounds having hydrosilyl groups concatenated through siloxane bonds as a crosslinking agent. Comparative Example 3 used a fluorinated organic silicon compound having three hydrosilyl groups as a crosslinking agent.

In contrast, Examples 1 to 3 used fluorinated organic silicon compounds falling in the range of component (B) of the invention as a crosslinking agent. Comparative Example 1 and Example 1, Comparative Example 2 and Example 2, and Comparative Example 3 and Example 3 are identical with each other except for the crosslinking agent. It is thus evident from Table 1 that the compositions within the scope of the invention cure into products having low compression set as compared with the prior art compositions.

The curable composition of the invention is readily curable by allowing to stand at room temperature or by moderate heating, into a cured product having solvent resistance, chemical resistance, heat resistance, and minimized compression set.

Japanese Patent Application no. 339049/1996 is incorporated herein by reference.

Although some preferred embodiments have been described, many modifications and variations may be made thereto in the light of the above teachings. It is therefore to be understood that within the scope of the appended claims, the invention may be practiced otherwise than as specifically described.

What is claimed is:

1. A fluorine-containing curable composition comprising (A) a linear perfluoro compound of the following formula (3) having at least two alkenyl groups in a molecule, a divalent perfluoroalkylene or perfluoropolyether structure in a backbone, and a viscosity of 25 to 1,000,000 centistokes at 25° C.,

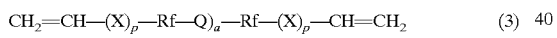  (3)

wherein Rf is a divalent perfluoroalkylene or perfluoropolyether group,

X is independently selected from the group consisting of —CH$_2$—, —CH$_2$O—, —CH$_2$OCH$_2$—, —Y—NR$^{1'}$—SO$_2$— and —Y—NR$^{1'}$—CO— wherein Y is —CH$_2$— or

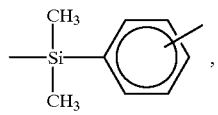, wherein R$^{1'}$ is a methyl or phenyl group, letter p is independently equal to 0 or 1, letter a is 0 or a positive integer, and Q is a group of the following formulae (4), (5) or (6):

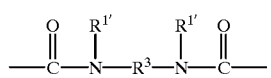  (4)

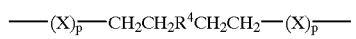  (5)

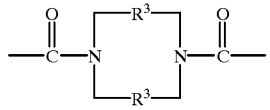  (6)

wherein X, p and R$^{1'}$ are as defined above, R$^3$ is a substituted or unsubstituted divalent hydrocarbon group, R$^4$ is a substituted or unsubstituted divalent hydrocarbon group which may have at least one intervening atom selected from oxygen, nitrogen, silicon, and sulfur atoms in its linkage or a group of the following formulae (7) or (8):

  (7)

  (8)

wherein R$^5$ is a substituted or unsubstituted monovalent hydrocarbon group and R$^6$ is a group containing at least one atom selected from carbon, oxygen, nitrogen, silicon, and sulfur atoms in its backbone structure, and letter a is 0 or a positive integer, (B) a fluorinated organic silicon compound of the following formula (1) having a viscosity of 10 to 5,000 centistokes at 25° C.,

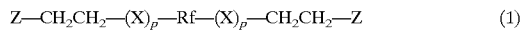  (1)

wherein Rf, X and p are as defined above, and Z is a group of the following formula (2):

  (2)

wherein R$^2$ is substituted or unsubstituted monovalent hydrocarbon group and letter b is equal to 2 or 3, component (B) being blended in such an amount as to give 0.5 to 5 mol of hydrosilyl group per mol of alkenyl group in component (A), and (C) a catalytic amount of a platinum group metal compound.

2. The composition of claim 1, wherein Rf in formulae (1) and (3) are divalent perfluoroalkylene groups represented by —C$_m$F$_{2m}$— wherein m is 1 to 10, or divalent perfluoropolyether groups represented by the following formulae:

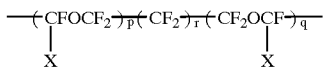

where X is F or CF$_3$ group, letters p, q, and r are integers satisfying p≧1, q≧1, 2≦p+q≦200, and 0≦r≦6;

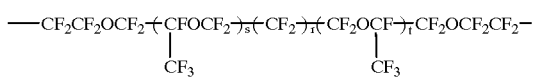

where letters r, s, and t are integers satisfying $0 \leq r \leq 6$, $s \geq 0$, $t \geq 0$, $0 \leq s+t \leq 200$;

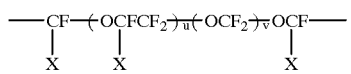

where X is F or $CF_3$ group, letters u and v are integers satisfying $1 \leq u \leq 100$ and $1 \leq v \leq 50$; or $$—CF_2CF_2—(OCF_2CF_2CF_2)_w—OCF_2CF_2—$$

where letter w is an integer of $1 \leq w \leq 100$.

3. The compositions of claim 1, wherein, when $R^{1'}$ is a substituted or unsubstituted monovalent hydrocarbon group, it is an alkyl group; cycloalkyl group; phenyl, tolyl, xylyl, or napthyl group; benzyl, phenylethyl, or phenylpropyl group; each of 1–12 carbon atoms and each optionally substituted by halogen atoms.

4. The composition of claim 1, wherein $R^3$ is an alkylene group, cycloalkylene group, phenylene, tolylene, xylylene, naphthylene, or biphenylene group, each of 1–10 carbon atoms and each optionally substituted by halogen atoms.

5. The composition of claim 1, wherein in formula (3), Q is of one of the following formulae:

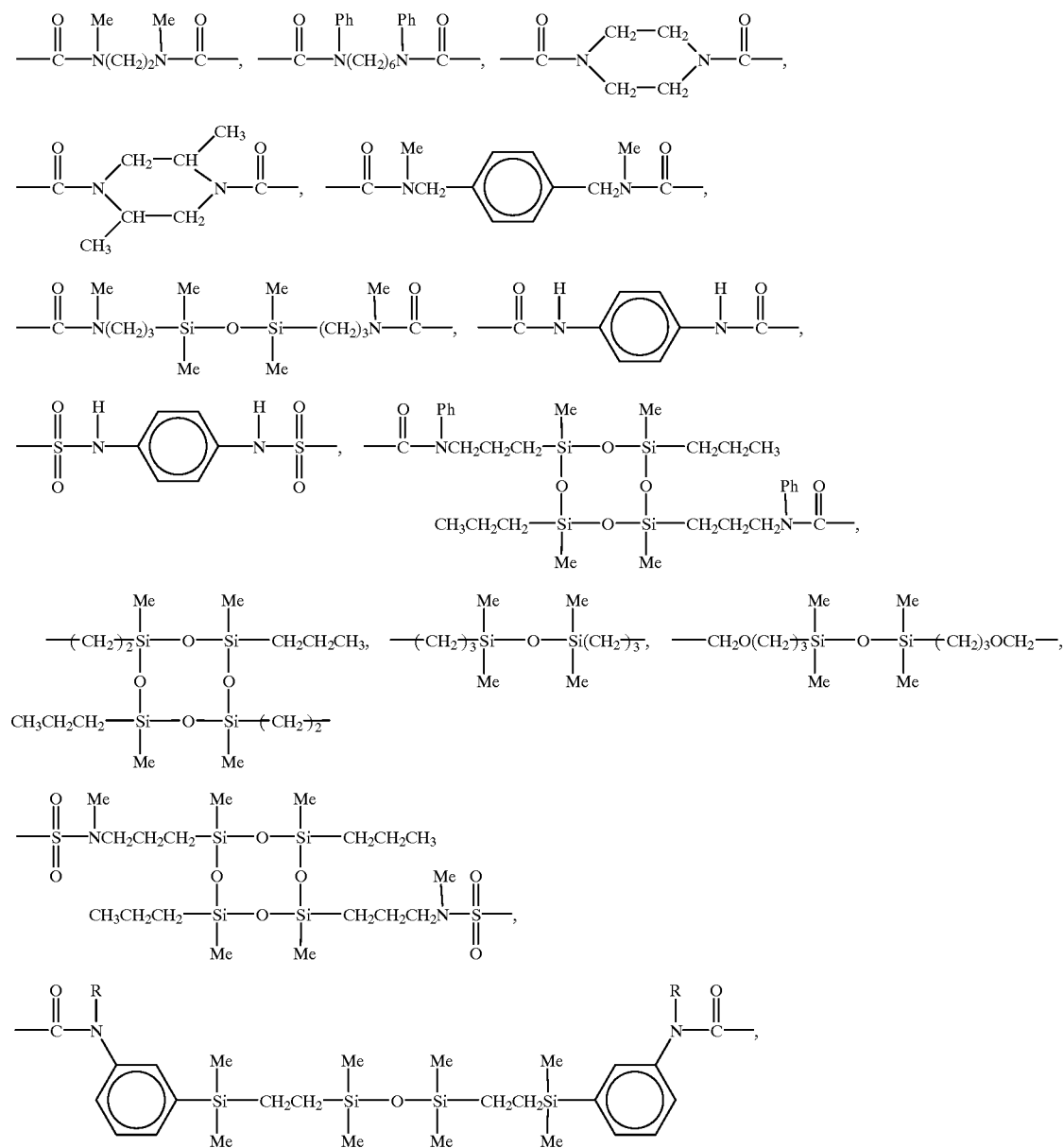

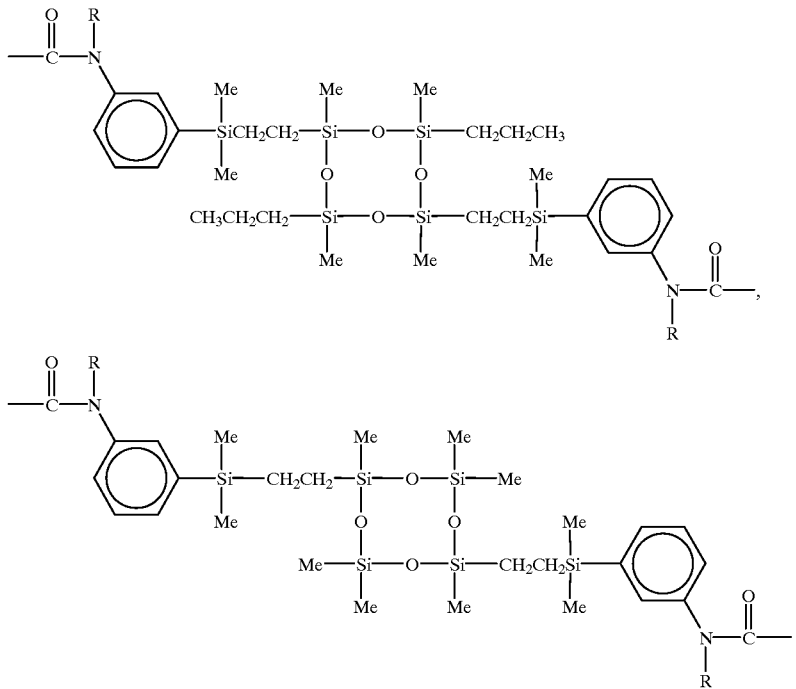

where Me is methyl, Ph is phenyl and R is hydrogen, methyl or phenyl.

6. The composition of claim 1, wherein in formula (3), letter a is an integer of 0 to 10.

7. The composition of claim 1, wherein the linear perfluoro compound as component (A) has a viscosity of 100 to 60,000 centistokes at 25° C.

8. The composition of claim 1, wherein the component (B) fluorinated organic silicon compound contains at least four hydrosilyl groups in a molecule.

9. The composition of claim 1, wherein $R^2$ is alkyl group; cycloalkyl group; phenyl, tolyl, or xylyl group; benzyl or phenylethyl group; each of 1–8 carbon atoms and optionally substituted by halogen atoms.

10. The composition of claim 1, wherein in formula (3), a is a positive integer.

11. The composition of claim 1, wherein in formula (1), p is 1.

* * * * *